United States Patent Office 3,654,269
Patented Apr. 4, 1972

3,654,269
1-4-SUBSTITUTED SEMICARBAZIDES AND
METHODS OF OBTAINING THEM
Antonio Luis Palomo Coll, Maestro Perez Cabrero 7,
Barcelona, Spain
No Drawing. Filed Mar. 20, 1969, Ser. No. 809,038
Int. Cl. C07c 133/02
U.S. Cl. 260—240 A                18 Claims

ABSTRACT OF THE DISCLOSURE

A 1-4-substituted semicarbazide of the formula

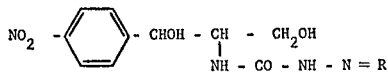

The method of obtaining the semicarbazides essentially comprises reacting 1-p-nitrophenyl-2-amino-1,3-propanediol in a suitable solvent with an alkylidene or benzylidene amino isocyanate.

The present invention refers to 1-4-substituted semicarbazides and methods of obtaining them.

The products obtained according to the present invention have shown themselves to possess an antibiotic and coccidiostatic activity and are of interest for medical and veterinary uses.

By this invention there are provided active substances, belonging to the semicarbazone group, obtained for the first time and corresponding to the Formula I, (I) 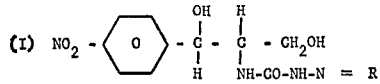

wherein R represents a structure resulting from the elimination of oxygen from a carboxyl compound which unites with the nitrogen to form the bond —N=R.

Those skilled in the art will be able to deduce from the above formula that these semicarbazones exist in diastereomeric and optically active forms, as cis or trans isomers, or better, erythro and threo isomers, as well as the racemic compounds. Therefore, the formula given is one of the possible structures and although the threo derivatives are preferably selected, the process described is common to all the isomers.

Also inorganic and organic salts such as hydrochlorides and tosylates are provided by this invention.

A suitable and preferred way of obtaining these semicarbazones, or 1-4-substituted semicarbazides, is by reacting the 1-p-nitrophenyl-2-amino-1,3-propanediol base with a compound of the formula:

where R has the meaning given above.

These alkylidene or benzylidene aminocyanates may be prepared in the same reaction medium at suitable temperatures and in the presence of the aminodiol base, or separately and then combined. In the former case, it is sufficient to subject a semicarbazone to heat treatment in a solvent such as dimethylformamide or another lower alkylamide such as dimethylacetamide; in the latter case, a hydrazone is reacted in an inert medium with phosgene or carbonyl chloride at room temperature or a lower temperature, is cooled and then reacted with the aminodiol base. In either case, the semicarbazone or hydrazone which carries the desired R group is selected.

Alternatively, the R group, for example, may be an isopropylidene or benzylidene substituent and by acid hydrolysis in the presence of inorganic or aryl sulphonic acids, it allows the 1-p-nitrophenyl-1,3-propanediol-2(4-semicarbazide) salts to be obtained. These combine readily with the carbonyl compounds to give rise to the formation of products of the Formula I. Also these compounds of the aforementioned formula, preferably the isopropylidene or benzylidene mentioned above, may, by interchange reaction with another carbonyl compound, originate substances according to Formula I in which R comes from the carbonyl used.

For these reactions, the normally used solvents may be used, such as: water, acetic acid, lower alcohols and substances with a carbonyl group, like aldehydes and ketones with or without substituents, or their acetal or gem-diacetate derivatives which release said carbonyl group in the same medium as the reaction takes place; for example, the bisulfate derivatives of aldehydes are suitable.

It is evident that the racemic semicarbazide may be broken down into its optically active compounds by way of optically active acids or ketones, by preparing the diastereoisomers and isolating by fractional crystallization. However, since the racemically and optically active bases of aminodiol are available, the process is much simpler and cheaper if one starts from these substances directly, without establishing a technically much more complex route.

EXAMPLE I

A mixture of 60 grams of 1-p-nitrophenyl-2-amino-1,3-propanediol, 32.5 gr. of acetone-semicarbazone and 300 ml. of dimethyl-formamide is heated to achieve a complete solution at 80° C. The evolution of ammonia starts at 120–125° C. and after a temperature of 150° is reached and 2½ hours have passed, the evolution of the gas has ceased. Then the product is concentrated at reduced pressure and the distillation residue is poured over 200 ml. of water, is cooled externally, filtered and washed with water. 65–70 grams are obtained of threo-1-p-nitrophenyl-1,3 - propanediol-2(4,isopropylidenesemicarbazide). The characteristics thereof as regards melting point, and rotatory power are as follows:

F=179–181° (ethanol)
$[\alpha]_D^{22}$=+245.3° (c.=1.985%; α=+4.88; l=1; DMSO)
$[\alpha]_D^{22}$=−245.2° (c.=1.990%; α=−4.88; l=1; DMSO)
respectively for L (+) and D (−).

If benzalsemicarbazone is used, the product obtained is threo-l-p-nitrophenyl - 1,3 - propanediol-2(4,benzylidene semicarbazide). F=169–70 (ethanol), $[\alpha]_D^{20}$=−488.3° (c.=1.026%; α=−4.60; l=1; DMSO).

If p-methylbenzalsemicarbazone is used, threo-l-p-nitrophenyl - 1,3 - propanediol-2(4,methyl-benzylidenesemicarbazide) is obtained. F=225–30° (methanol), $[\alpha]_D^{22}$= −467.3° (c.=1.979%; α=−9.25; l=1; DMSO).

EXAMPLE II

The benzalhydrazones will be prepared by the Curtius & Lublin method (Ber. 33, 2460 (1900) or by Hinman's method (J. Org. Chem. 25, 1778 (1960). To a solution of 14.8 g. of phosgene in 100 ml. of dry benzene and 20 gr. of trimethylamine which is then cooled, there is added in parts with ample stirring 16.5 gr. of p-nitrobenzalhydrazone; after room temperature is reached, the blend is heated for a few minutes to complete the reaction and the excess phosgene is driven off. The solution is cooled and filtered and 20 gr. of L (+) threo-l-p-nitrophenyl-2-amino-1,3-propanediol are added, the solution is stirred and cooled; then it is concentrated at reduced pressure and the residue is poured over a 5% aqueous acetic acid solution and after being stirred, is filtered, washed and dried. Some 28.2 gr. of L (+) threo-l-p-nitrophenyl - 1,3 - propanediol-2(4,nitrobenzylidenesemicarbazide) are obtained with a 70% yield. F=158–60°

(ethanol), $[\alpha]_D^{21}=+524.8°$ (c.=0.968%; $\alpha=+5.08$; l=1; DMSO).

EXAMPLE III 75 g. of isopropylidene derived from L (+) or D (−) threo-l-p-nitrophenyl - 1,3 - propanediol-2(4,semicarbazide) in 75 ml. of concentrated hydrochloric acid at about 40°, the solution is saturated by passing a current of hydrogen chloride at room temperature, after resting for three hours, it is filtered, washed with isopropanol and ethyl acetate. 65 gr. of L (+) or D (−) threo-l-p-nitrophenyl-1,3-propanediol-2(4,semicarbazide) hydrochloride are obtained, with a 92.7% yield; F=183–6° and $[\alpha]_D^{21}=74.1°$ (c.=1.0248%; $\alpha=-0.76$; l=1; DMSO). Dextro compound $[\alpha]_D^{20}=+74.0°$ at the same concentration.

The parallel tosylates are isolated with p-toluensulphonic acid.

EXAMPLE IV

To a solution of 15 gr. of dextro- or levo-hydrochlorate previously prepared in 100 ml. of 50% aqueous acetic acid, there are added 6 gr. of salicyl aldehyde, the mixture is heated for a few minutes at 90°, is cooled and diluted with about 100 ml. water, filtered and washed with water and an almost quantitative yield of threo-p-nitrophenyl-1,3-propanediol-2(4,o-hydroxi - benzylidene semicarbazide) is obtained. F=164–7° and $[\alpha]_D^{21}=390.6°$ (c.=0.9880%; $\alpha=-3.86$; l=1; DMSO).

The derivatives of o-nitro and m-nitrobenzaldehyde, 2-methyl-1,4-naphthaquinone and benzophenone are prepared in the same way and with the same yield, with the corresponding values. The products obtained are, respectively: threo-p-nitrophenyl-1,3-propanediol - 2(4,o-nitrobenzylidenesemicarbazide, F=193–5°; $[\alpha]_D^{21}=381.7°$ (c.=1.0087%; $\alpha=-3.85$; l=1; DMSO); threo-p-nitrophenyl-1,3-propanediol-2(4,m - nitrobenzylidenesemicarbazide, F=132–6°, $[\alpha]_D^{21}=394.9°$ (c.=1.004%; $\alpha=-3.95$; l=1; DMSO); threo-p-nitrophenyl-1,3-propanediol-2(4,2-methyl - 1,4 - naphthaquinone semicarbazide), F=258–60° (yellow) $[\alpha]_D^{20}=-598.9°$ (c.=1.936%; $\alpha=-11.6$; l=1; DMSO) and threo - p - nitrophenyl-1,3-propanediol-2(4,benzophenone semicarbazide), F=164–172°; $[\alpha]_D^{20}=-180.1°$ (c.=1.0544°; $\alpha=-1.90$; l=1; DMSO).

6.53 gr. of the sodium salt of o-sulphobenzaldehyde and 9.50 gr. of semicarbazide hydrochloride are dissolved in 100 ml. of methanol. After undergoing reflux heating for 5 minutes, the solution is cooled, decolored and the filtrate is evaporated at reduced pressure. It gives an almost quantitative yield in threo-p-nitrophenyl-1,3-propanediol - 2(4,o - sulphobenzylidene semicarbazide), F= 260 (d.) and $[\alpha]_D^{20}=-306.5°$ (c.=1.0048%; $\alpha=-3.08$; l=1; DMSO).

With parahydroxybenzaldehyde, the reaction mixture dissolved in water separates an oil, which when washed with water solidifies. Threo-l-p-nitrophenyl-1,3-propanediol-2(4,p-hydroxybenzylidene semicarbazide) is obtained.

EXAMPLE V

A solution of 32 gr. dextro or levo isopropylidene derived from l-p-nitrophenyl-1,3-propanediol - 2(4,semicarbazide) in 90 ml. of a 66% solution of ethanol containing 0.5 ml. of sulphuric acid and the stoichiometric amount of carbonyl compound is reflux heated. After about five minutes heating, the precipitation already begins in certain cases; in others, after cooling, the mixture is diluted with water. In those cases in which oil is isolated, the oil crystallizes from its solution in acetic acid-water: this happens, for instance, with p-dimethylaminobenzylidene and cinnamalidene derivatives. Similar transformation results are obtained with benzylidene and p-methylbenzylidene semicarbazides instead of the isopropylidene initially described.

If the carbonyl compound used is isatin, the product obtained is threo-l-p-nitrophenyl - 1,3 - propanediol-2(4,isatin semicarbazide), F=191–5° (yellow orange), $[\alpha]^{22}_D=+327.6°$ (c.=1.984%; $\alpha=+6.50$ l=1; DMSO).

If the carbonyl compound used is cinnamic aldehyde, the product obtained is threo-l-p-nitrophenyl-1,3-propanediol-2(4,cinnamylidene semicarbazide), F=130–5° (pale yellow); $[\alpha]_D^{22}=+525.9$ (c.=1.987%; $\alpha=+10.45$; l=1; DMSO).

If the carbonyl compound used is p-dimethylaminobenzaldehyde, the product obtained is threo-l-p-nitrophenyl-1,3-propanediol-2(4,p - dimethyl benzylidene semicarbazide), F=139–41° (ethanol), $[\alpha]_D^{22}=622.7°$ (c.= 1.991%; $\alpha=-12.40$; l=1; DMSO).

If the carbonyl compound used is p-methoxybenzaldehyde, the product obtained is threo-l-p-nitrophenyl-1,3-propanediol-2(4,p - methoxy-benzylidene semicarbazide), F=111–14° (and solidifies at F=183°), $[\alpha]_D^{22}=477.6°$ (c.=1.989%; $\alpha=-9.50$; l=1, DMSO).

If the carbonyl compound used is furfuraldehyde, the product obtained is threo-l-p-nitrophenyl-1,3-propanediol-2(4,furfurylidene semicarbazide), F=149–53°, $[\alpha]^{22}=+492.4°$ (c.=1.984%; $\alpha=+9.78$; l=1, DMSO).

If the carbonyl compound used is 5-nitro-2-furfuraldehyde, the product obtained is threo-l-p-nitrophenyl-1,3-propanediol-2[4,(5-nitro-2-furfurylidene) semicarbazide], F=217–18° (d.) (yellow), $[\alpha]_D^{22}=+626.9$ (c.=1.375%; $\alpha=+8.62$; l=1, DMSO) and $[\alpha]_D^{21}=-627.9$ and (c.= 1.0192%; $\alpha=-6.40$; l=1, DMSO).

What I claim is:

1. A 1-4-substituted semicarbazide of the formula

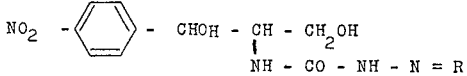

wherein R is a benzylidene, furfurylidene or naphthoquinone group, the hydrocarbon nucleus of which may be substituted with methyl, methoxy, chlorine, nitro, dimethylamine or hydroxy.

2. Threo - 1 - p-nitrophenyl - 1,3-propanediol-2(4,-isopropylidene semicarbazide).

3. Threo - 1 - p-nitrophenyl - 1,3-propanediol-2(4,-benzylidene semicarbazide).

4. Threo - 1 - p-nitrophenyl - 1,3-propanediol-2(4,-benzylidene-substituted semicarbazide).

5. Threo - 1 - p-nitrophenyl - 1,3-propanediol-2(4,-semicarbazide).

6. Threo - 1 - p-nitrophenyl - 1,3-propanediol-2(4,-semicarbazide) hydrochloride.

7. Threo - 1 - p-nitrophenyl - 1,3-propanediol-2(4,-semicarbazide) tosylate.

8. Threo - 1 - p-nitrophenyl - 1,3-propanediol-2[4,(2-methyl-1,4-naphthaquinone) semicarbazide].

9. Threo - 1 - p-nitrophenyl - 1,3-propanediol-2(4,-benzophenone semicarbazide).

10. Threo - 1 - p-nitrophenyl - 1,3-propanediol-2(4,-isatin semicarbazide).

11. Threo - 1 - p-nitrophenyl - 1,3-propanediol-2(4,-cinnamylidene semicarbazide).

12. Threo - 1 - p-nitrophenyl - 1,3-propanediol-2(4,-furfurylidene semicarbazide).

13. Threo - 1 - p-nitrophenyl - 1,3-propanediol-2[4,-(5-nitro-2-furfurylidene) semicarbazide].

14. A method of obtaining 1,4-substituted semicarbazides comprising reacting a 1,p-nitrophenyl-2-amino-1,3-propanediol and an alkylidene aminoisocyanate to obtain a compound of the formula

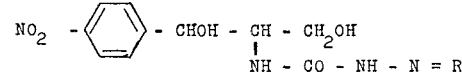

wherein R is a benzylidene, furylidene or naphthoquinone group, the hydrocarbon group of which may be substituted with a methyl, methoxy, chloro, nitro, dimethylamine or hydroxy group.

15. A method as claimed in claim 14, comprising the steps of generating an alkylidene aminoisocyanate by reaction with a semicarbazone in dimethylformamide or dimethylacetamide at a temperature of from 120° to 150° C.

16. A method as claimed in claim 15, wherein the semicarbazones used are the benzaldehyde, furfuraldehyde and 2-methylnaphthoquinone semicarbazones.

17. A method as claimed in claim 14, wherein R is p-chlorobenzylidene, 5-nitro-2-furfurylidene or 2-methylnaphthoquinone group.

18. A method as claimed in claim 14 wherein R is 5-nitro-2-furfurylidene.

References Cited

Palomo, Chemical Abstracts, vol. 70, abstract No. 57321e on page 313, Abstracting Palomo, Afinidad, 1968, pp. 453-4.

Palomo, Afinidad, vol. 25, No. 258, pp. 453-454, July-August 1968 issue.

JOHN D. RANDOLPH, Primary Examiner

U.S. Cl. X.R.

260—240 G, 325, 396 N, 453 A, 554, 566, 999